United States Patent [19]

Miller

[11] Patent Number: 5,315,683
[45] Date of Patent: May 24, 1994

[54] VENTILATED FIBER OPTIC BUSHING

[76] Inventor: Jack V. Miller, 700 N. Auburn Ave., Sierra Madre, Calif. 91024

[21] Appl. No.: 34,224

[22] Filed: Mar. 19, 1993

[51] Int. Cl.$^5$ .............................................. G02B 6/00
[52] U.S. Cl. .................................. 385/136; 385/115; 385/119; 362/62
[58] Field of Search ........................ 385/136, 115-120, 385/137, 78, 84, 89; 362/62

[56] References Cited

U.S. PATENT DOCUMENTS

| | | | |
|---|---|---|---|
| 4,747,660 | 5/1988 | Nishioka et al. | 385/115 |
| 4,922,385 | 5/1990 | Awai | 362/32 |
| 5,036,194 | 7/1991 | Hazel | 385/115 X |
| 5,099,399 | 3/1992 | Miller et al. | 362/32 |

Primary Examiner—Rodney B. Bovernick
Assistant Examiner—Phan Thi Heartney

[57] ABSTRACT

A ventilated fiber optic bushing includes a bundle of elongated, optical fiber light guides having generally cylindrical diameters, each light guide having a first end remotely emitting light and terminating in a convex second end in a common plane. The bundle is held in a desired shape receiving light through a transparent window having the same size and shape as the fiber bundle, the window being transversely disposed in an aperture of a light projector wherein a cooling fan within the projector draws external air through the aperture around the window. A rigid tube holds the bundle of light guides in the desired shape within the aperture projector with the convex second ends of the guides against the transparent window. A portion of the external air drawn through the projector aperture is drawn longitudinally through interstices between the light guides and transversely between the interstices formed by the convex light guide ends and the transparent window. The rigid tube holding the bundle is removable from the projector aperture.

7 Claims, 1 Drawing Sheet

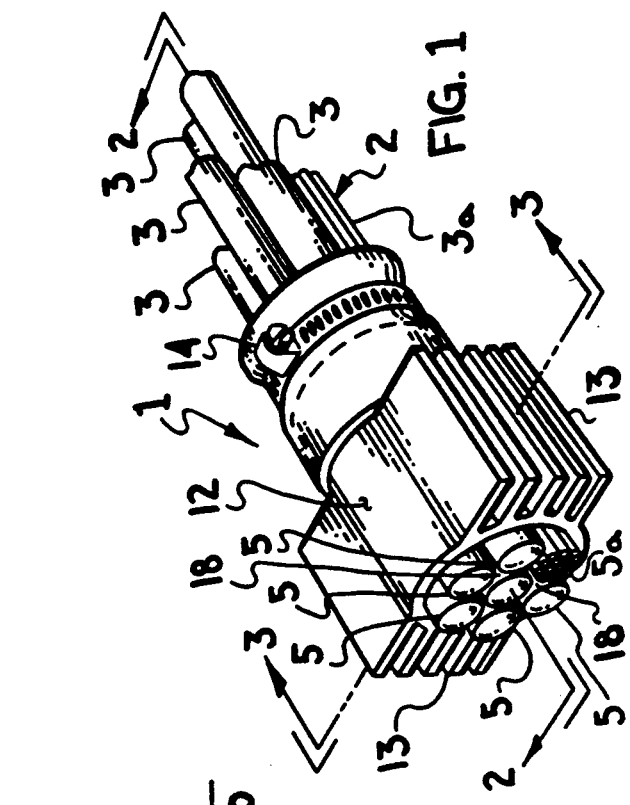
FIG. 1
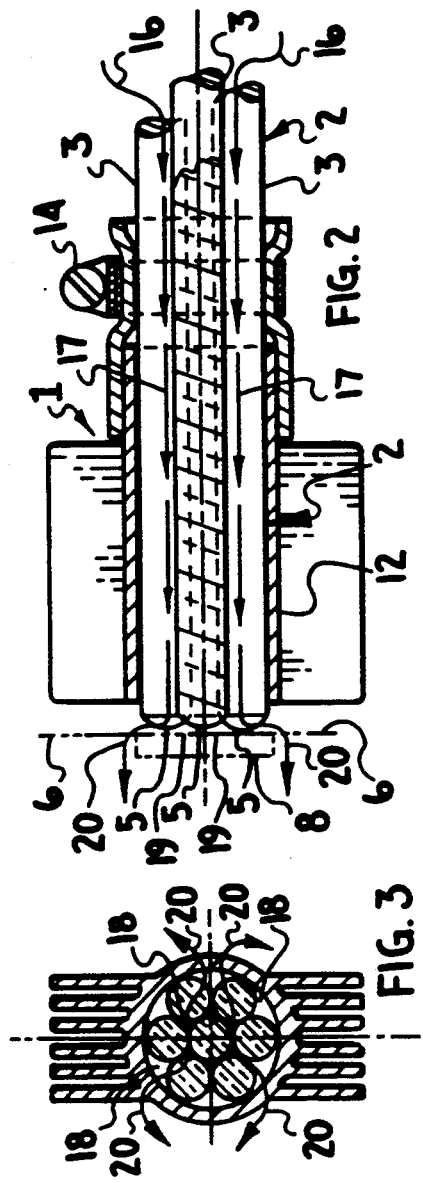
FIG. 2
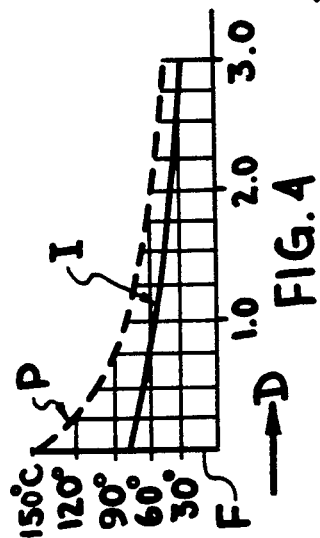
FIG. 3
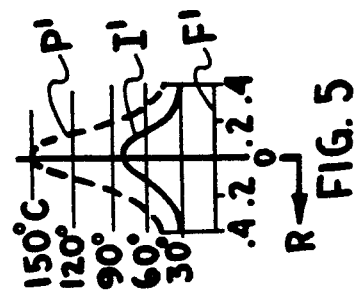
FIG. 4
FIG. 5

VENTILATED FIBER OPTIC BUSHING

BACKGROUND OF THE INVENTION

This invention applies to the field of fiber optic light guides, and more particularly to a bundle of light guides held in an aperture and receiving light from a fiber optic projector.

A principal disadvantage of such currently known fiber optic light guides is that the intense illumination from a light projector causes the light guides to heat, age and often burn the surface of the fiber ends, destroying the light guide prematurely.

Glass optical fibers are very heat resistant, but the fiber ends are bundled together and potted with epoxy, making the entrance end of the light guide heat sensitive, as the epoxy ages and chars around the glass fibers at temperatures around 160° C. Therefore, it is necessary to limit the temperature to the operating temperature of the epoxy, not the glass fibers.

Some plastic light guides have a soft, "solid core" construction, in which the flexible core is sheated in a thin-wall tube of heat-resistant plastic. The light-transmitting solid core can operated at temperatures as high as 150° C., but in long-term use, the core ages, discolors, cross-links and embrittles.

Acrylic (polymethyl methacrylate) fibers are low cost light guides that have very accurate color transmission. This combination of low cost and true color transmission makes it very desirable to use acrylic light guides for commercial lighting applications. However, the maximum continuous operating temperature for acrylic optical fibers is only 70° C. If operated at or below the continuous service temperature, acrylic fibers will last for more than a decade without aging or discoloring. However, above 80° C. the acrylic plastic fiber ends begin to soften, distort and melt. Therefore, acrylic fiber manufacturers recommend that the light source not be focussed on the fiber bundle, so the light is not concentrated on the center of the fibers. This reduces melting and burning the fibers, but such defocussing throws much of the light outside the bundle, diminishing the optical efficiency of the system.

Since light guide temperature is critical for all types of fibers, many thermal control techniques are presently used to reduce the heat to protect the end of the fiber bundles. Thermal control techniques include the use of dichroic reflector lamps, defocussing the lamp image, cooling fans, infrared reflecting dichroic mirrors between the lamp and fiber bundle, and optically-tuned heat absorbers, such as seen in the applicant's U.S. Pat. No. 5,099,399.

The center of a fiber optic bundle at the bushing receiving projector light tends to slowly increase in temperature over extended time periods, as there is a limited means for dissipating heat from the central fibers. Since fiber life expectancy varies inversely with temperature, there is a need for an efficient way to dissipate heat from the center of the fiber bundle.

The basic purpose of the present invention is to provide a fiber optics bushing in which cooling air from outside a fan-cooled fiber optic projector is drawn through interstices between the fibers and across the illuminated face of the bundle of fibers to maintain a suitably low operating temperature

SUMMARY OF THE INVENTION

The achievement of the foregoing purposes of the invention is accomplished by the preferred embodiment of the present invention in which a ventilated fiber optic bushing includes a bundle of elongated, optical fiber light guides having generally cylindrical diameters, each light guide having a first end remotely emitting light and terminating in a convex second end in a common plane within a light-emitting aperture of a fiber optic illuminator, i.e., projector. The convex end of each fiber has a spherical radius at least equal to twice the light guide diameter, and no greater than ten times the light guide diameter.

The bundle receives light through a transparent window within a light-emitting aperture of a fiber optic projector wherein a cooling fan within the projector draws external air through the aperture and around the window. A rigid tube holds the bundle of light guides in the desired shape within the aperture of the projector with the convex second ends of the guides against the transparent window. The fibers are clamped into the rigid tube, wherein a portion of the external air drawn through the projector aperture is drawn longitudinally through interstices between the light guides and transversely between the interstices formed by the convex light guide ends and the transparent window.

In a preferred embodiment the rigid tube holding the bundle is removable from the projector aperture. The light guides are clamped into the rigid tube with a length of elastomeric tubing having a first end attached to the rigid tube and a second end compressively urged against the bundle by a circumferential clamp.

BRIEF DESCRIPTION OF THE DRAWINGS

FIG. 1 is a perspective view of a ventilated fiber optic bushing according to the present invention;

FIG. 2 is a side cross-sectional view of the fiber optic bushing of FIG. 1, taken along section line 2—2 on the central axis of FIG. 1;

FIG. 3 is a cross-sectional view of the fiber optic bushing of FIG. 1, taken along section line 3—3, transverse to the central axis;

FIG. 4 is a plot of fiber temperature versus longitudinal distance from the fiber face; and FIG. 5 is a plot of fiber temperature versus radial distance from central axis.

DETAILED DESCRIPTION OF THE DRAWINGS

In FIGS. 1 and 2 a ventilated fiber optic bushing 1 according to the present invention is shown having a bundle 2 of elongated, optical fiber light guides 3 having generally cylindrical diameters, each light guide having a first end (not shown) remotely emitting light and terminating in a convex second end 5 in a common plane 6 shown in FIG. 2. The light guides 3 shown are illustrated as single fibers, but may also be cylindrical groups 3a of small diameter fibers polished into a similar convex end shown as 5a. Bundle 2 is held in a desired shape receiving light through a transparent window 8 (shown in phantom) having the same size and shape as fiber bundle 2. Window 8 is transversely disposed in a light-emitting aperture of a light projector (not shown) wherein a cooling fan within the projector draws external air 20 around window 8.

A rigid tube 12, which is removably insertable into the light-emitting aperture of a light projector or illuminator (not shown) holds bundle 2 of light guides 3 in a desired shape with the convex second ends 5 of light guides 3 against transparent window 8. A preferred embodiment of tube 12 includes a plurality of radiative cooling fins 13.

A circumferential clamp 14 around an elastomeric tube 15 is provided as a means for clamping the fibers 3 into rigid tube 12 wherein a portion 17 of the external air 16 is drawn through the interstices 18 between the light guides 3 and transversely between the interstices 19 formed by the convex light guide ends 5 and transparent window 8 as cooling air flow 20 as seen in FIG. 2 and FIG. 3.

In FIG. 4 a plot of the temperature gradient measured longitudinally along a central fiber is shown as curve I for the present invention, and as curve P for prior art bushings in which the fibers are potted together, precluding cooling air flow through the fiber interstices. The temperature in C.° is shown at from face F of the central fiber ends over the longitudinal distance D in inches from the face.

In FIG. 5 a plot of the temperature gradient measured transversely across a fiber bundle is shown as curve I' for the present invention, and as curve P' for prior art bushings in which the fibers are potted together, precluding cooling air flow through the fiber interstices. The temperature in C.° is shown at the fiber bundle face across the radial distance R from the central axis of the bundle.

Long-term temperature tests, conducted with thermocouples buried within fiber bundles have shown that the addition of cooling air through the bundle interstices according to the invention resulted in the peak fiber temperature at the fiber entrance end of the central fiber being reduced by as much as half the temperature measured in potted bundles of the same fiber material and size.

I claim:

1. A ventilated fiber optic bushing for receiving light from a light-emitting window within an aperture of a light projector, said window being transversely disposed in said aperture and wherein a cooling fan within the projector draws external air through said aperture around said window; the fiber optic bushing including:

a bundle of elongated, optical fiber light guides, said bundle having generally the same size and shape as the light-emitting window of the projector, each of said light guides having a generally cylindrical diameter, a first end remotely emitting light and a second end having a convex termination receiving light from the light-emitting window of the projector;

a rigid tube for holding the bundle of light guides in the shape of the light-emitting window of the projector with the convex second ends of the light guides held in a common plane against the window of the projector;

a means for clamping the fibers into the rigid tube;

wherein a portion of the external air drawn through the projector aperture is drawn longitudinally through interstices between the light guides and transversely between the interstices formed by the convex light guide ends and the transparent window.

2. A ventilation fiber optic bushing according to claim 1 in which the rigid tube holding the bundle is removable from the projector aperture.

3. A ventilated fiber optic bushing according to claim 1 in which the means for clamping the light guides into the rigid tube is a length of elastomeric tubing having a first end attached to the rigid tube and a second end compressively urged against the bundle by a circumferential clamp.

4. A ventilated fiber optic bushing according to claim 1 in which the rigid tube holding the bundle is removable from the aperture of the projector.

5. A ventilated fiber optic bushing according to claim 1 in which the convex second end of each light guide has a spherical radius at least equal to twice the light guide diameter, and no greater than ten times the light guide diameter.

6. A ventilated fiber optic bushing according to claim 1 in which the light guides are single optical fibers.

7. A ventilated fiber optic bushing according to claim 1 in which one or more of the light guides is comprised of a plurality of optical fibers bonded together into a cylindrical shape and terminating in a convex second end.

* * * * *